United States Patent
Sunkara et al.

(10) Patent No.: US 12,073,002 B2
(45) Date of Patent: Aug. 27, 2024

(54) ENHANCING USER IDENTIFICATION WITH PRIVACY PROTECTION ACROSS WEB SERVERS

(71) Applicant: Fanplayr Inc., Menlo Park, CA (US)

(72) Inventors: Rajiv Sunkara, Mountain View, CA (US); Simon Yencken, Palo Alto, CA (US); Derek Adelman, Atherton, CA (US)

(73) Assignee: Fanplayr Inc., Menlo Park, CA (US)

( * ) Notice: Subject to any disclaimer, the term of this patent is extended or adjusted under 35 U.S.C. 154(b) by 340 days.

(21) Appl. No.: 17/694,587

(22) Filed: Mar. 14, 2022

(65) Prior Publication Data

US 2022/0335164 A1    Oct. 20, 2022

Related U.S. Application Data

(60) Provisional application No. 63/172,036, filed on Apr. 7, 2021.

(51) Int. Cl.
G06F 21/62    (2013.01)
G06F 21/60    (2013.01)

(52) U.S. Cl.
CPC ........ G06F 21/6263 (2013.01); G06F 21/602 (2013.01)

(58) Field of Classification Search
CPC .......................... G06F 21/6263; G06F 21/602
See application file for complete search history.

(56) References Cited

U.S. PATENT DOCUMENTS 7,698,170 B1    4/2010  Darr et al.
8,850,526 B2    9/2014  Jayaraman et al.

2007/0065206 A1    3/2007  Silverbrook et al.
2007/0150588 A1    6/2007  Ghadialy et al.
2012/0084749 A1    4/2012  Gogh et al.
(Continued)

FOREIGN PATENT DOCUMENTS

AU    2018309599    7/2018
AU    2022202023    3/2022
(Continued)

OTHER PUBLICATIONS

Your Privacy Policy Must Include a "Do Not Track" (DNT) Clause, PrivacyPolicies.com, Nov. 15, 2021, 21 pages (downloaded Dec. 6, 2021 from https://www.privacypolicies.com/blog/privacy-policy-dnt-do-not-track/ ).

(Continued)

*Primary Examiner* — Mohammad W Reza
(74) *Attorney, Agent, or Firm* — Haynes Beffel & Wolfeld, LLP; Ernest J. Beffel, Jr.

(57) ABSTRACT

The technology teaches limiting sharing of visitor identity information across web sites, receiving from a visited web site server in a visitor's browser a page with a privacy script that runs in the browser and interfaces with a privacy ID server and third-party apps that seek visitor identification. The privacy script running in the browser retrieves a first party cookie including a visitor ID, forwards the cookie to the privacy ID server, receives from the privacy ID server, a site-by-app-specific ID for the visited site and one of the apps, and provides respective server site-by-app-specific IDs to respective third-party apps, without providing the visitor ID to the apps, thereby allowing tracking of the visitor on repeat visits to the visited site but not facilitating identification of the visitor across sites. Site-by-app-specific IDs for the visitor are distinct and uncorrelated for among distinct pairs of the web sites and third-party apps.

20 Claims, 5 Drawing Sheets

(56) References Cited

U.S. PATENT DOCUMENTS

| | | | |
|---|---|---|---|
| 2012/0203639 | A1 | 8/2012 | Webster et al. |
| 2012/0259891 | A1 | 10/2012 | Edoja |
| 2013/0085804 | A1 | 4/2013 | Leff et al. |
| 2014/0245075 | A1 | 8/2014 | Dhoolia et al. |
| 2014/0283069 | A1 | 9/2014 | Call et al. |
| 2016/0092914 | A1 | 3/2016 | Wiener et al. |
| 2016/0330237 | A1 | 11/2016 | Edlabadkar |
| 2017/0004519 | A1 | 1/2017 | Rao Gadiyar et al. |
| 2017/0161728 | A1 | 6/2017 | Satyanarayan et al. |
| 2017/0300768 | A1 | 10/2017 | Perschk |
| 2018/0240145 | A1 | 8/2018 | Zargham et al. |

FOREIGN PATENT DOCUMENTS

| | | |
|---|---|---|
| AU | 2022256046 | 9/2023 |
| CN | 102246150 A | 11/2011 |
| CN | 105453052 A | 3/2016 |
| CN | 201880062101.8 | 7/2018 |
| EP | 18760069.7 | 7/2018 |
| EP | 22785408.0 | 11/2023 |
| JP | 2020-529092 | 7/2018 |
| JP | 2020-5290092 | 7/2018 |
| JP | 2023-044566 | 3/2023 |
| JP | 2023-559120 | 9/2023 |
| WO | 0157738 A1 | 8/2001 |
| WO | 2014203015 A1 | 12/2014 |
| WO | PCT/US2018/043195 | 7/2018 |
| WO | PCT/US2022/023472 | 4/2022 |

OTHER PUBLICATIONS

Patel, S. "Forget Me, Forget Me Not—The Right to Be Forgotten in the US", Journal of Intellectual Property Law, Univ of Georgia School of Law, May 10, 2021, 7 pages (downloaded Dec. 6, 2021 from https://jiplonline.com/2021/05/10/forget-me-forget-me-not-the-right-to-be-forgotten-in-the-united-states/).

Adelman, "Fanplayr Knowledge Base, Fanplayr Segmentation FAQ v 1.4", Mar. 10, 2014, 24 pages.

Adelman, "Fanplayr Knowledge Base, Fanplayr Analytics FAQ v 1.1", Mar. 10, 2014, 18 pages.

Adelman, "Fanplayr Knowledge Base, Segmentation Strategy White Paper v 1.0", Jul. 20, 2015, 29 pages.

Singh—"Fanplayr Whitepaper: The Transformation of Retailing, Empowering the Online Retailer", University of California, Santa Cruz, Jun. 1, 2017, 33 pages.

Brambilla et al., Asynchronous Web Services Communication Patterns in Business Protocols, Jan. 1, 2005, WEB Information Systems Engineering—Wise 2005 Lecture Notes In Computer Science; Lncs, Springer, Berlin, De, pp. 435-442.

U.S. Appl. No. 16/020,730, now U.S. Pat. No. 10,958,743, filed Mar. 23, 2021.

U.S. Appl. No. 16/202,730—Allowance dated Nov. 24, 2020, 10 pages.

U.S. Appl. No. 16/202,730—Final Office Action dated Jun. 16, 2020, 28 pages.

U.S. Appl. No. 16/202,730—Office Action dated Feb. 7, 2020, 32 pages.

U.S. Appl. No. 16/202,730—Response to Final Office Action dated Jun. 16, 2020, filed Sep. 14, 2020, filed 14 pages.

U.S. Appl. No. 16/202,730—Response to Office Action dated Feb. 7, 2020, filed Mar. 15, 2020, 16 pages.

PCT/US2018/043195—2nd Article 34 Amendment filed Aug. 27, 2019, 6 pages.

PCT/US2018/043195—2nd Written Opinion of the International Examining Authority dated Jun. 27, 2019, 4 pages.

PCT/US2018/043195—3rd Article 34 Amendment filed Oct. 25, 2019, 26 pages.

PCT/US2018/043195—Demand and Article 34 Amendment filed May 31, 2019, 22 pages.

PCT/US2018/043195—International Preliminary Report on Patentability dated Nov. 18, 2019, 29 pages.

CN 201880062101.8—First Office Action dated Sep. 20, 2020, 10 pages.

CN 201880062101.8—Response to First Office Action dated Sep. 20, 2020, as filed on Jan. 25, 2021, 13 pages.

CN 201880062101.8—Response to Second Office Action dated Apr. 6, 2021 filed Jun. 21, 2021, 11 pages.

CN 201880062101.8—Second Office Action dated Apr. 6, 2021, 7 pages.

CN 201880062101.8—Third Office Action dated Jun. 26, 2021, 5 pages.

JP 2020-529092—First Office Action dated Jan. 11, 2022.

EP 187600697 First Office Action, dated Feb. 1, 2021, 4 pages.

EP 187600697 Rules 161(1) and 162 Communication, dated Mar. 25, 2020, 3 pages.

EP 187600697 Second Office Action, dated Jul. 28, 2021, 4 pages.

AU2018309599 Notice of Acceptance dated Jan. 20, 2022.

AU2018309599 Response to First Exam Report dated Jan. 12, 2022.

AU2018309599 First Exam Report dated Oct. 29, 2021.

U.S. Appl. No. 17/195,475, filed Mar. 8, 2021, US2021-0194976A1.

U.S. Appl. No. 17/195,475 Notice of Allowance dated Mar. 3, 2022.

PCT/US2022/23742 International Search Report and Written Opinion dated Aug. 3, 2022.

U.S. Appl. No. 16/020,730, filed Jun. 27, 2018, now U.S. Pat. No. 10,958,743.

U.S. Appl. No. 17/195,475, filed Mar. 8, 2021, US20210194976.

U.S. Appl. No. 17/867,587, filed Jul. 18, 2022, US 20230010184.

ENHANCING USER IDENTIFICATION WITH PRIVACY PROTECTION ACROSS WEB SERVERS

PRIORITY

This application claims priority to Application No. 63,172,036, titled "Enhancing User Identification with Privacy Protection Across Web Servers", filed Apr. 7, 2021.

RELATED CASES

This application is related to U.S. application Ser. No. 17/195,475, titled "Method and System for Segmentation as a Service", filed Mar. 8, 2021 8 Mar. 2021

This application is also related to U.S. application Ser. No. 16/020,730 titled "Method and System for Segmentation as a Service", filed 27 Jun. 2018, now U.S. Pat. No. 10,958,743, issued 23 Mar. 2021.

The related cases are incorporated by reference herein for all purposes.

BACKGROUND

Browser vendors have begun making privacy a key focus. To ensure privacy, and restrict tracking of users across the Internet, they have introduced restrictions on the cookie life, third-party cookie expiration, URL decoration and even completely blocking tracking scripts they deem to be detrimental to the user's privacy. Within the next year (2021), support for third-party cookies is going to go away, meaning most tracking services will face an uphill battle to track users in any meaningful way.

Many competing proposals are in play, in which large ad network/solution providers have proposed different identification mechanisms. Most of the proposals are aimed at tracking users across sites, and try to maintain the status quo for ad networks. This approach will rely on many networks and publishers to sign up to make it useful. The larger "standards" are ones that expect the end user to create a single account on a third-party site, and then 'login using that account' on every publisher site. This is the equivalent of 'Sign in with Google', or 'Sign in with Facebook'.

One of the greatest challenges that ad networks and third-party scripts on sites are facing is that they will no longer be able to track users using cookies. This means that a user will no longer be able to be effectively identified across visits.

An opportunity arises to help sites continue to leverage third-party services while maintaining the privacy of the users, in a way that is compliant with the intent of the changes being made by browser vendors, including masking user identity across web servers.

SUMMARY

The technology disclosed relates to limiting sharing of visitor identity information across web sites following elimination of third-party cookies. This includes receiving from a visited web site server a visitor's browser web page that includes a privacy script that runs in the visitor's browser and interfaces directly or indirectly with a privacy ID server and includes one or more third-party apps that seek identification of the visitor. The disclosed method also includes the privacy script running in the browser retrieving a first party cookie including a visitor ID, the privacy script forwarding directly or indirectly at least part of the first party cookie to the privacy ID server, and the privacy script receiving from the privacy ID server site-by-app-specific IDs for the visitor that are distinct and uncorrelated for distinct pairs of web sites and third-party apps. Further included is providing respective server site-by-app-specific IDs to respective third-party apps, without providing the visitor ID to the third-party apps, thereby allowing tracking of the visitor on repeat visits to the visited web site but not facilitating identification of the visitor across web sites. Also included is the ability to offer services such as 'Do Not Track' or 'Forget Me' to visitors to a site that would be valid for the site and for any and all third part apps on the site. The disclosed system further includes an arbiter of user identification for any website, in addition to helping to map the services for ensuring data exchange.

Systems and methods of masking user identity across web servers include receiving from a server a web page that includes a crypto ID script that runs in a browser and interfaces directly or indirectly with a cryptographic ID server and further includes one or more apps. Also disclosed is the crypto ID script running in the browser retrieving a cookie including a user ID, the crypto ID script forwarding directly or indirectly at least part of the cookie to the cryptographic ID server, and the crypto ID script receiving from the cryptographic ID server server-by-app-specific IDs that are distinct and uncorrelated for distinct triplets of user, web servers and apps. Further disclosed is providing respective server server-by-app-specific IDs to respective apps, without providing the user ID to the apps.

As used in this context website refers to mobile apps on iOS and Android platforms as well as browsers on desktop machines and mobile devices, and IoT devices.

Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

DETAILED DESCRIPTION

The following detailed description is made with reference to the figures. Example implementations are described to illustrate the technology disclosed, not to limit its scope, which is defined by the claims. Those of ordinary skill in the art will recognize a variety of equivalent variations on the description that follows.

Ad networks and third-party scripts on sites will no longer be able to track users using third-party cookies, given the current constraints that browsers have put in place. This means that a user will no longer be able to be effectively identified across visits. With a number of browser restrictions in place, and being planned, most third-party services struggle with identifying users The disclosed technology for Enhanced User Identification (EUI) utilizes Privacy ID to provide unique user IDs to third-party services, in the browser and in real-time, helping them better identify users and utilize first-party data. EUI is implemented using server-side, HTTP, secure and same-site cookies to identify users effectively across visits. By generating and maintaining a Privacy ID-mapped unique Id for each third-party API key, the disclosed technology obviates the need for third-party scripts to track visit history independently. The disclosed technology can result in a reduction of the size of the website footprint of third-party apps, which may expand dramatically in a third-party cookie-less world.

The disclosed Privacy ID technology is a system that is an arbiter of user identification for any website and also of helping map the services for ensuring data exchange between the services. Using this system, third-party services on the site will be allowed to continue to identify returning users, as required to maintain their service, without generating a single ID for tracking users across sites, thus providing the user with privacy and ensuring the data remains first-party. Using the disclosed system, websites will be able to focus on and enhance the quality of their first-party data, using a single integration that enables identifying users, new and repeat, across the services integrated into the website, while protecting visitor privacy.

The technology disclosed for Privacy ID identifies a user on a particular website and browser, and maintains unique service-specific versions of the user ID to be shared with each service. This puts the website in control of which service has access to a user ID and user privacy is respected as Fanplayr avoids identifying users across websites. Next, we describe an example system for limiting sharing of visitor identity information across web sites, and for masking user identity across web servers.

Architecture

Figure 1:
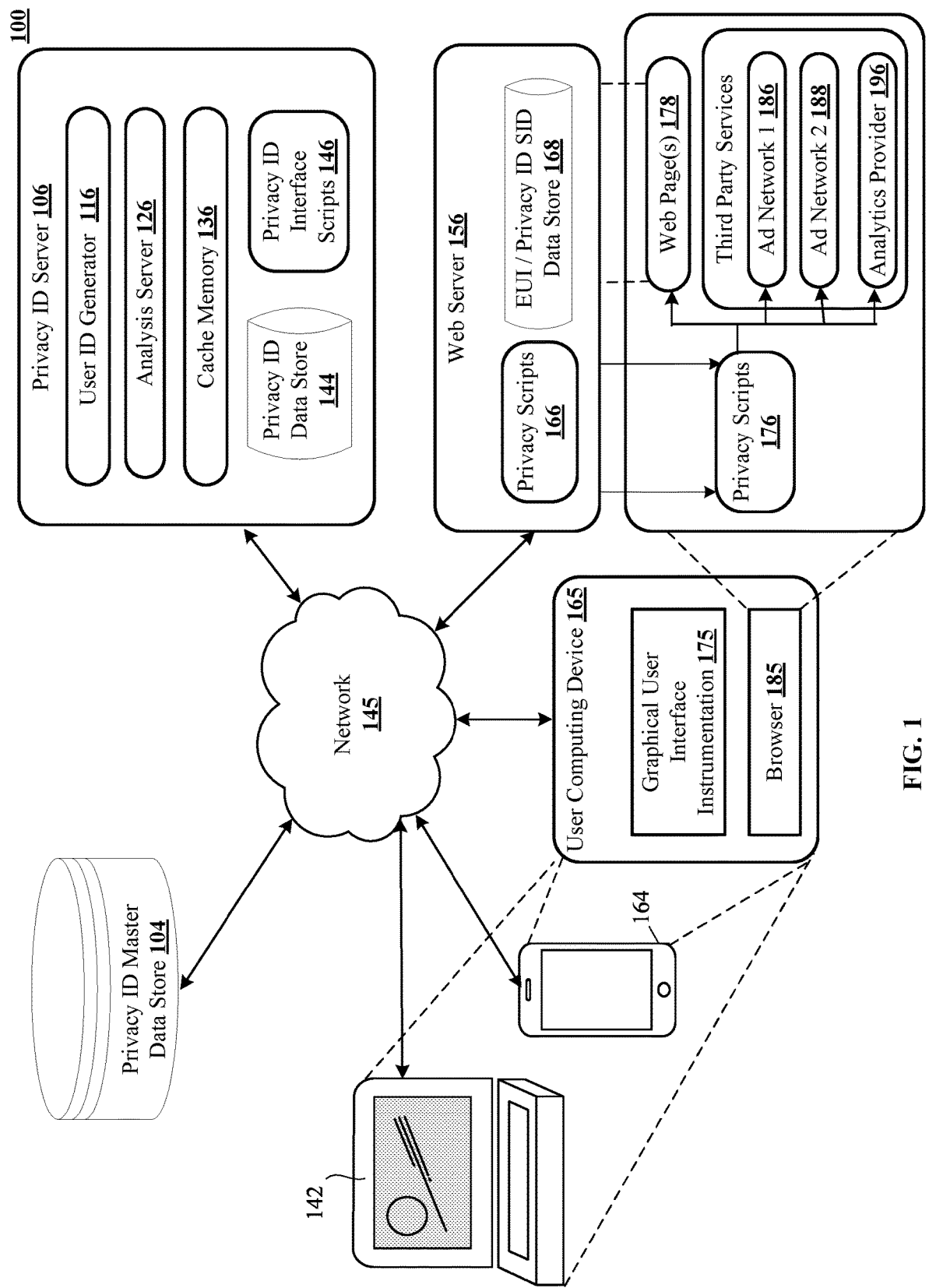
FIG. 1 shows a block diagram of an example environment for limiting sharing of visitor identity information and history sharing across web sites following elimination of third-party cookies, in accordance with an implementation of the technology disclosed.

FIG. 1 illustrates a system 100 for limiting sharing of information, and controlling history sharing across web sites following elimination of third-party cookies. The disclosed system utilizes a single service to monitor and track users and data and ensure compliances for General Data Protection Regulations (GDPR), California Consumer Privacy Act (CCPA), "forget me" requests, etc., while respecting browser restrictions, with user identification in a first party context. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes Privacy ID server 106 with user ID generator 116 for generating a user ID that is unique to a service and site combination. Privacy ID server 106 also includes analysis server 126 for retrieving the same unique user ID that was generated upon the first visit, and cache memory 136 for storing visitor data and account settings. Analysis server 126 can accumulate data among distributed computers for many visitors to many websites. Analysis server 126 assigns tags to the visitor's session and transmits IDs, via the call back address registered for the web page(s). Analysis server 126 accumulates data about activity during the visitor's web site session and analyzes the instrument readings to track progress of the session.

System 100 also has Privacy ID data store 144 for storing user data and analysis results, and has privacy ID interface scripts 146 for use by customers' web servers. Customers enable browser and privacy compliant user identification for the services on site, by uploading templates provided in common programming languages to their web server 156 via Privacy ID server 106, for integrating the services. In another implementation, customers can use the templates as a blueprint for writing their own integration scripts for completing an integration of third-party apps through the use of a JavaScript injection onto the website. Process flow is described relative to FIG. 2 below.

System 100 utilizes web server 156 that delivers web page(s) 178 for user interaction via browser 185. Web server 156 receives data from the web page(s), utilizing an identified call back address and instrumentation code for callback registration, via network 145. Web server 156 has privacy scripts 166, for integrating the browser experience for a customer over time. Web server 156 also has Enhanced User Identification (EUI)/Privacy ID SID data store 168 for storing unique user IDs to third-party services. EUI is implemented using server-side, HTTP, secure and same-site cookies to identify users effectively across visits. Privacy ID server 106 receives a series of instrument readings from the user session with the web page(s) 178, along with a callback API to which to deliver results.

System 100 further includes user computing device 165 with graphical user interface (GUI) instrumentation 175 that provides a display layer for user laptop or desktop computer 142 and mobile device 164. User computing device 165 utilizes instrumentation code for generating an administration interface with which administrators configure and manage the system. The administrator can request creation of a unique API Key for each third-party service they would like to enable, while also providing additional information about the third-party script. One implementation includes an extensive display toolkit with which customers can easily create a wide range of message placements in the form of interstitial banners, interactive sliders, fly outs and overlays. User computing device 165 includes a web browser 185 for displaying web page(s) 178 delivered by web server 156, for visitors. Browser 185 delivers third party applications such as ad network 1 186, ad network 2 188 and analytics provider 196 such as Google Analytics, as third-party services available for the customers along with web pages(s) 178. Each third-party service has a unique user ID associated with the service, and privacy scripts 176 capture instrument readings from the user session with the webpage(s) 178 and third-party services. In some implementations, browsers can include Microsoft Edge, Google Chrome, Apple Safari, Mozilla Firefox and the like. In some implementations, user computing device 165 can be a personal computer, laptop computer, tablet computer, smartphone, Internet of Things (IoT) devices, digital image capture devices, personal digital assistant (PDA), and the like. Administration capabilities can also include decommissioning services as needed. When decommissioned, any service requesting a user ID will not be given an ID, thereby giving full control to the site, when administrators configure and manage the system. Depending on the services using the system, the site can enable data exchange. In one example, an exit intent company may provide the email address back into the system, which the site can decide to share with a customer data platform (CDP) system. Privacy ID interface scripts 146 include a repository of the scripts on the website, usable for providing a 'Privacy Settings' option to end users of the website. In these settings, users will have the opportunity to turn on/off tracking for individual scripts or all scripts as a whole, which can be utilized as support for GDPR and CCPA. 'Forget me' requests (GDPR, CCPA) can be handled from one place as a request from the user can easily be broadcast to all the services using the system, passing them their respective IDs. The disclosed system can also integrate into privacy consent frameworks such as Interactive Advertising Bureau's (IAB's) transparency and consent framework, in order to be able to provide a single click solution for granting or revoking permissions by an end user.

In some implementations, network(s) 145 can be any one or any combination of Local Area Network (LAN), Wide Area Network (WAN), Wi-Fi, WiMAX, telephone network, wireless network, point-to-point network, star network, token ring network, hub network, peer-to-peer connections like Bluetooth, Near Field Communication (NFC), Z-Wave, ZigBee, or other appropriate configuration of data networks, including the Internet.

System 100 can further include privacy ID master data store 104, connected to privacy ID server 106 via network 145. In some implementations, datastores can store information from one or more tenants into tables of a common database image to form an on-demand database service (ODDS), which can be implemented in many ways, such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices.

Figure 2:
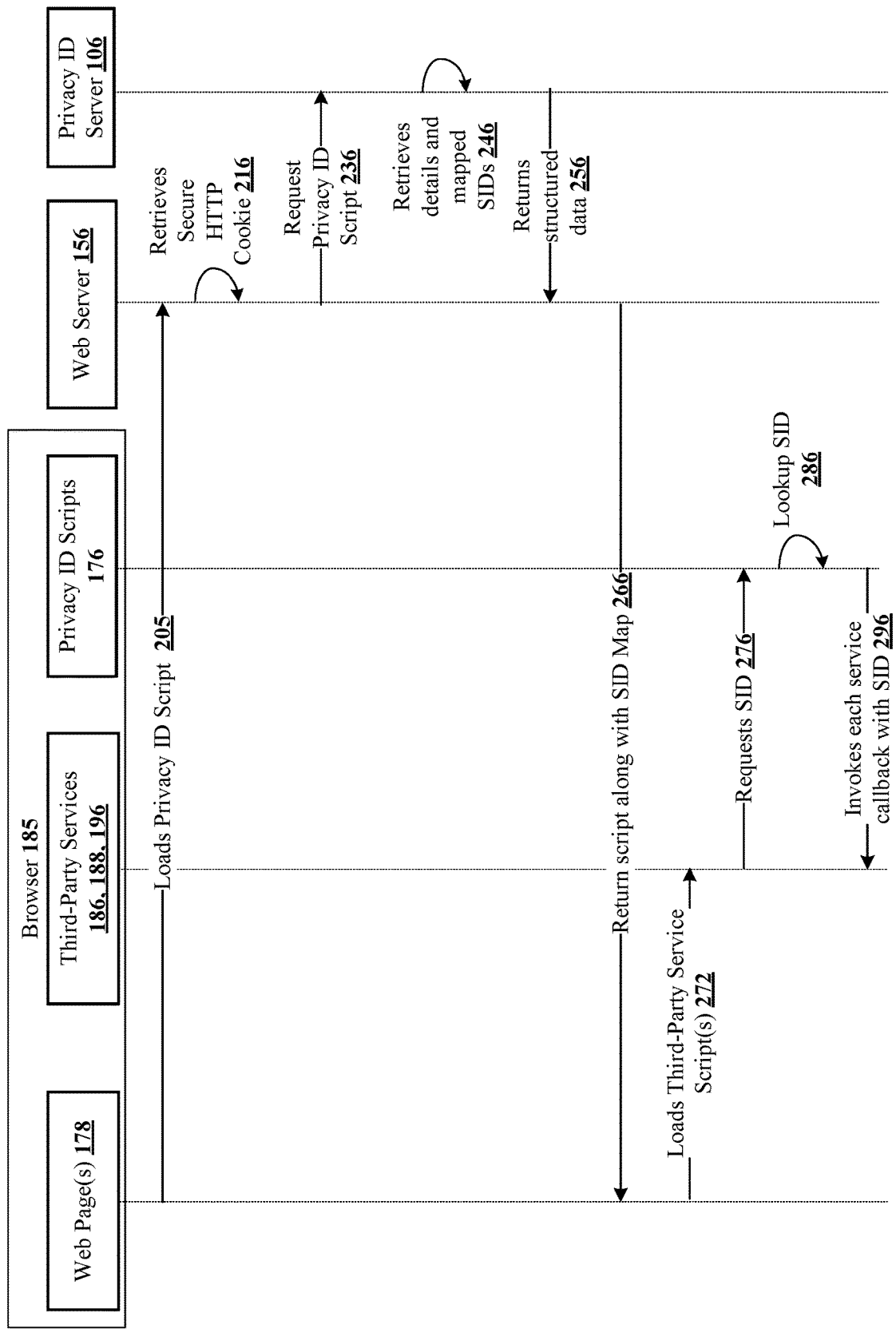
FIG. 2 shows a message diagram for a process for limiting sharing of visitor identity information and history sharing across web sites following elimination of third-party cookies.

FIG. 2 shows a message diagram for a process for limiting sharing of information, and history sharing across web sites following elimination of third-party cookies. A user requests a web page and browser 185 sends a web page request to web server 156 for loading privacy ID script, and optionally provides details to help re-identify a returning user. Web server 156 retrieves secure HTTP cookie 216, and provides the secure cookie and details to help re-identify a returning user, including the cookie value, to request privacy ID script 236, from privacy ID server 106. Privacy ID server 106 retrieves mapped service IDs (SIDs) 246 and details from cache memory 136 and/or privacy ID data store 144. Privacy ID server 106 returns structured data 256 with SID map and script to web server 156. Web server 156 sends privacy ID script along with SID map 266 to web page(s) 178 at browser 185.

Continuing the description of the message diagram of FIG. 2 for limiting sharing of information and history sharing across web sites, web page(s) 178 load third-party service scripts 272. Third-party services 186, 188, 196 request service IDs (SIDs) 276 from the privacy ID scripts 176 running in the browser 185. Each service identifies itself using an assigned API Key and optionally provides other details to share. Third-party services 186, 188, 196 register a callback for an asynchronous response. Browser 185 privacy ID scripts 176 look up SID 286 for requesting service, in SID map received from web server 156, and invokes each service callback with SID 296. If there was no SID for the API Key, a SID is generated and the SID is then updated in the next step. The web page(s) get executed and visualized within browser 185. Disclosed privacy ID scripts are typically implemented in JavaScript that embeds the code for the disclosed functionality on the web page. Browser 185 configures callback functions that reflect the choices specified by the website operator. In one implementation, the callback function can activate a chatbot, an email service, an SMS messenger service, a survey service, or other desired reaction to a visitor to the website. The website operator exposes one or more callback functions that will be visible and later executed. In one implementation of the disclosed technology, a website operator embeds code that registers a listener on each of their website pages. They can register multiple listeners, depending on the ways they want to handle events.

In one implementation, the callback function can initiate a call to display a chat window using a third-party service or show a popup requesting the user to subscribe to a newsletter. In other implementations a third-party service that protects the integrity of sensitive secure data, such as users' private personal information, can be implemented as the callback function. In yet other cases, a callback function can initiate a call to a survey software tool, or a news media distribution service or a credit calculator. A further implementation can include a call to a set of insurance-related tools for assessing risk and calculating rates. The reader can extrapolate to additional software tools that could also be instantiated by a callback function.

Example Fanplayr user ID (FID) and service user ID (SID) representations are listed below. The FID is unique for each user, and the SID is unique for each service.

Sample FID: 5.bwsmcrcIGkPY4yE8LoO.1574662629

Sample SID: PID.1.aND59wuPDpDZoFRBVZ8.1598301024

An example of an embedded script on the pages of a website are listed below.

```
<script>
/**
 * Fanplayr Privacy ID Queue (Like Google Analytic's "dataLayer")
 * The website would need to place this as high on the page as possible.
 */
window._fpidq = window._fpidq || [ ];
```

This convenient method defined by the web pages, abstracts away the details of Privacy ID for use by third-party services, so that third-party services do not need to know how Privacy ID works. They can simply pass their API Key and callback.

```
function getIdentifiedUser(apiKey, callback) {
    window._fpidq.push({
        method: 'identify',
        apiKey: apiKey,
        callback: callback
    })
}
</script>
```

An example of third-party scripts invoking the Privacy ID API is listed below.

friendly version of the "script Content" property returned in the example listed above. A different scripting language can also be utilized to deliver the disclosed functionality.

```
getIdentifiedUser('DzvOVJQH91TumGL2urPHPQSxUbf67vs0', function(sid) {
console.log('Google Analytics received SID :', sid);
});
```

Example FID cookie content is shown below.
5.bwsmcrcIGkPY4yE8LoO.1574662629

An example script on a customer web server is listed next. The Fanplayr server is also referred to as the Privacy ID server 106 in this document. Account key is a JavaScript string that acts as a customer ID that identifies the customer website from which data is being collected and specifies the current attributes associated with the user of the web page.

```
// The account key uniquely identifies the website to Fanplayr services
const accountKey = 'd78978e96ac813947382f21ed7324228';
// The cookie name to be used
const userKeyCookieName = 'fanplayr';
// Get user key cookie from browser request.
const userKey = req.cookies[userKeyCookieName];
// Lookup the user and services from the remote Fanplayr server.
const result = await lookupUserAndServices(
 accountKey,
 userKey
);
// Update the user key cookie
const expires = new Date( );
expires.setFullYear(expires.getFullYear( ) + 1);
res.cookie(userKeyCookieName, result.userKey, {
 expires,
 path: '/',
 httpOnly: true,
 secure: true,
 sameSite: 'strict'
});
// Output the script with the services built into it.
// Note: The script content returned by the Fanplayr service includes the sidMap in it
res
 .header('content-type', 'application/javascript; charset=utf-8')
 .header('cache-control', 'must-revalidate')
 .send(result.scriptContent);
```

An example of the returned FID and script content are listed below.

```
{
"fid": "5.bwsmcrcIGkPY4yE8LoO.1574662629",
"scriptContent": "(function( ){const
SERVICE_USERS={\"DzvOVJQH91TumGL2urPHPQSxUbf67vs0\":\"PID.1.aND59wuP
DpDZoFRBVZ8.1598301024\"};const queue=window._fpidq=window._fpidq||[ ];const
handlers={identify(event){const
userKey=SERVICE_USERS[event.apiKey]||null;if(event.callback){event.callback(userKey)
}}};function processEvent(event){const
handler=handlers[event.method];if(handler){handler(event)}}
queue.push=function(event){processEvent(event)};for(const event of
queue){processEvent(event)}}( ))"
}
```

An example JavaScript script for invoking each service callback with respective SID is listed next, using a reader-

```
(function( ) {
// This is the sidMap containing one sid per API key
const SERVICE_USERS = {
  "DzvOVJQH91TumGL2urPHPQSxUbf67vs0":
"PID.1.aND59wuPDpDZoFRBVZ8.1598301024"
```

```
};
const queue = window.__fpidq = window.__fpidq || [ ];
const handlers = {
  identify(event) {
     const userKey = SERVICE_USERS[event.apiKey] || null;
     if (event.callback) {
event.callback(userKey);
     }
  }
};
function processEvent(event) {
  const handler = handlers[event.method];
  if (handler) {
     handler(event);
  }
}
// Redefine native array "push" method so we can detect new elements being
// added.
queue.push = function(event) {
  processEvent(event);
};
// Process initially queued events
for (const event of queue) {
  processEvent(event);
}
}( ));
```

In one implementation, two sets of clusters of servers—one on the east coast and one on the west coast, provide speedier responses to the browser, so their data can be redirected to w1.fanplayr.com or e1.fanplayr.com, with w1 for west and e1 for east depending on the geographical location of the website visitor. In one implementation the analyzing gets processed in the cloud.

Figure 3:
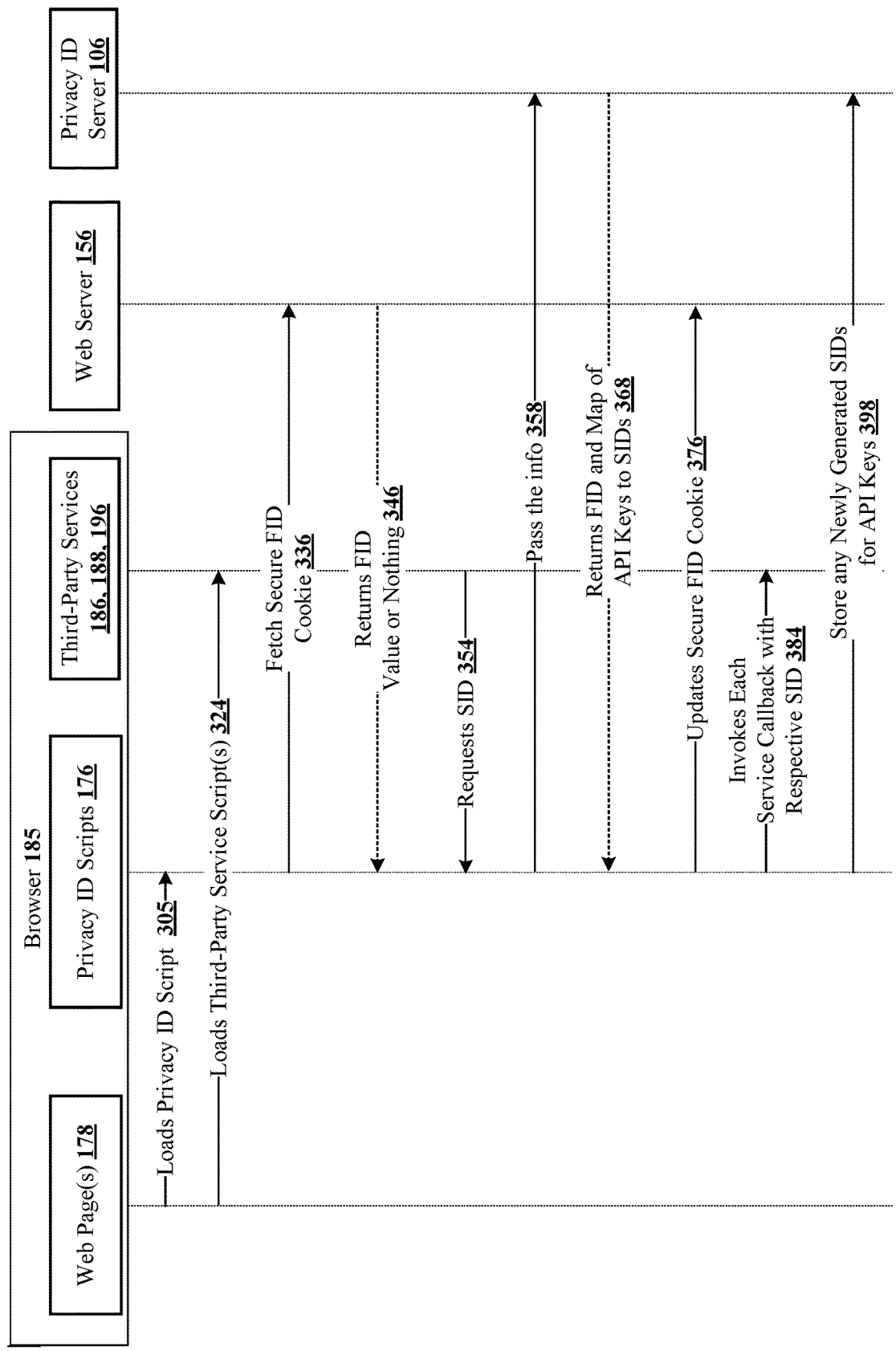
FIG. 3 shows a message diagram for an alternative process for limiting sharing of visitor identity information and history sharing across web sites following elimination of third-party cookies.

FIG. 3 shows a message diagram for an alternative process for masking user identity across web servers, and for giving control over information and history sharing across web sites following elimination of third-party cookies. A user requests a web page and browser 185 loads privacy ID script(s) 305 in web page(s) 178, and optionally provides details to help re-identify a returning user. Web page(s) 178 load third-party service scripts 324. Privacy ID scripts 176 fetch secure FID cookie 336 from web server 156, which returns the FID value or nothing 346. If nothing is returned, the user of web page(s) 178 needs to establish a secure connection with privacy ID server 106.

Continuing the description of the alternative process for masking user identity across web servers, shown in FIG. 3, after the FID value is returned from web server 156, third-party services 186, 188, 196 request service IDs (SIDs) 354 from the privacy ID scripts 176 running in browser 185. Each service identifies itself using an assigned API Key and optionally provides other details to share. Third-party services 186, 188, 196 register a callback for an asynchronous response. Privacy ID scripts 176 passes the information 358 to Privacy ID server 106. This may or may not include an FID, Web Push Notification info, customer ID, email, SMS, etc. Privacy ID server 106 returns FID and API Keys to SIDs 368 to privacy ID scripts 176. Privacy ID server 106 in browser 185 updates secure FID cookie 376 in web server 156 and invokes each service callback with respective SID 384. In the case in which there was no SID for the API Key, a SID is generated, and the SID is then updated in the next step. Privacy ID scripts 176 running in browser 185 store any newly generated SIDs for API Keys 398 in Privacy ID server 176.

Next, we describe use case examples for systems that utilize the disclosed control over information and history sharing across web sites following elimination of third-party cookies for masking user identity across web servers.

Use Case Examples

Analytics Services: Data and analytics have become very important aspects of operating websites and online businesses. Building analytics for websites is expensive and hence websites choose to use third-party services to help them understand the traffic to their website. Most analytics services such as Google Analytics, Mixpanel™ etc. require a simple integration through the use of a JavaScript injection onto the website. These scripts capture the data that they deem necessary and pass the captured data on to their servers. To be effective and provide excellent service to the website operators, it is imperative for the analytics services to be able to identify visitor traffic accurately. Privacy policies, browser restrictions and other technical limitations make it difficult for such services to do so.

With the use of Fanplayr's Privacy ID, third-party analytics services are able to identify users more accurately, and the data services provided by them become more meaningful to the websites and businesses.

The following listing shows an example of a way that the disclosed Fanplayr Privacy ID can be used to identify users in Google Analytics. This assumes that the Fanplayr Privacy ID script is available on the web page.

```
// This line injects the Google Analytics Script on to the site
<script async src="https://www.googletagmanager.com/gtag/js?id=G-
KMQ6G8H6N7"></script>
// This block is required by Google Analytics to initialize the service
<script>
window.dataLayer = window.dataLayer || [ ];
function gtag( ){
dataLayer.push(arguments);
}
gtag('js', new Date( ));
gtag('config', 'G-XXXXXXXXXX');
</script>
// This is the additional code required for GA to use Fanplayr Privacy ID
<script>
```

-continued

```
getIdentifiedUser('<PRIVACY-ID-API-KEY-FOR-GA>', function(sid) {
window.dataLayer.push({
'userid' : sid
});
});
</script>
```

Website Chat Services: In today's world, it has become a staple feature to provide users with the ability to find answers to questions they may have, via Chat. Sites integrate with AI services to provide Chatbots that can help answer questions. Although very useful, it is a very impersonal service and even when the user has received answers to their questions, they do not feel like they have a connection to the site.

With the use of Fanplayr's Privacy ID, third-party Chatbot services are able to identify users more accurately, and the services provided by them become more meaningful and personal to the users of the website. For example, when identifying a returning visitor, the chatbot could start with a simple but personal message such as 'Hello, Welcome back!'. To extend this use case, it is also possible that with an accurately identified user, the chatbot is able to access the user's history with the website, making the interaction more contextual and relevant to the user.

The following listing shows an example of a way that the disclosed Fanplayr Privacy ID can be used to identify users for Chatbot services. This assumes that the Fanplayr Privacy ID script is available on the web page.

```
// This line injects the Chatbot service on to the site
<script async src="https://www.chatbotservices... "></script>
// This is the additional code required for the service to leverage Privacy ID
<script>
getIdentifiedUser('<PRIVACY-ID-API-KEY-FOR-CHATBOT>', function(sid) {
window.dataLayer.push({
'userid' : sid
});
});
</script>
```

Linked Service List Request: Performing the role of a user ID arbiter, Privacy ID is in a unique position to be able to provide information to website users about the scripts on the site, which ones have requested a Service ID and the specific user's Service ID provided to each of the scripts/services. This can help the website provide transparency to their users. Combined with Fanplayr's targeting solution, users can be shown a widget that lists the services and allows users to enable/disable specific Service IDs.

Linked Service Data Request: GDPR, CCPA and other regional privacy laws have led to a slew of rules that websites have to follow. One of the common requirements between such regulations is the ability for website users to make a request to the website to provide the information that has been gathered by them and third-party services acting on their behalf. Most websites provide a mechanism that is detailed in the Privacy Policy. Most times such data requests must be sent via email or postal mail. In doing so, the website can provide the users with the information that they have gathered but the downside is that third-party services have no means by which they can identify the user and retrieve data. In the absence of a unified identification mechanism between the website and the diverse services used, data requests are not fulfilled by the third-party services. Acting as the arbiter of IDs, the disclosed Privacy ID can enable such data requests to be made onsite by the user and generate a single report containing all the user's specific Service IDs. Such a report can then be used by the website to procure the data from all services and provide it to their users.

Linked Service Forget-Me Request: Similar to the Linked Service Data Request described above, privacy laws require websites to provide a mechanism by which website users can request that all the data stored about them is deleted and forgotten. Here again, with the lack of a unified identification mechanism, third-party services are unable to recognize the user and delete the data gathered. Acting as the arbiter of IDs, Privacy ID can enable such a forget-me request to be made onsite by the user and generate a single report containing all the user's specific Service IDs. Such a report can then be used by the website to make such requests to individual third-party services.

Figure 4:
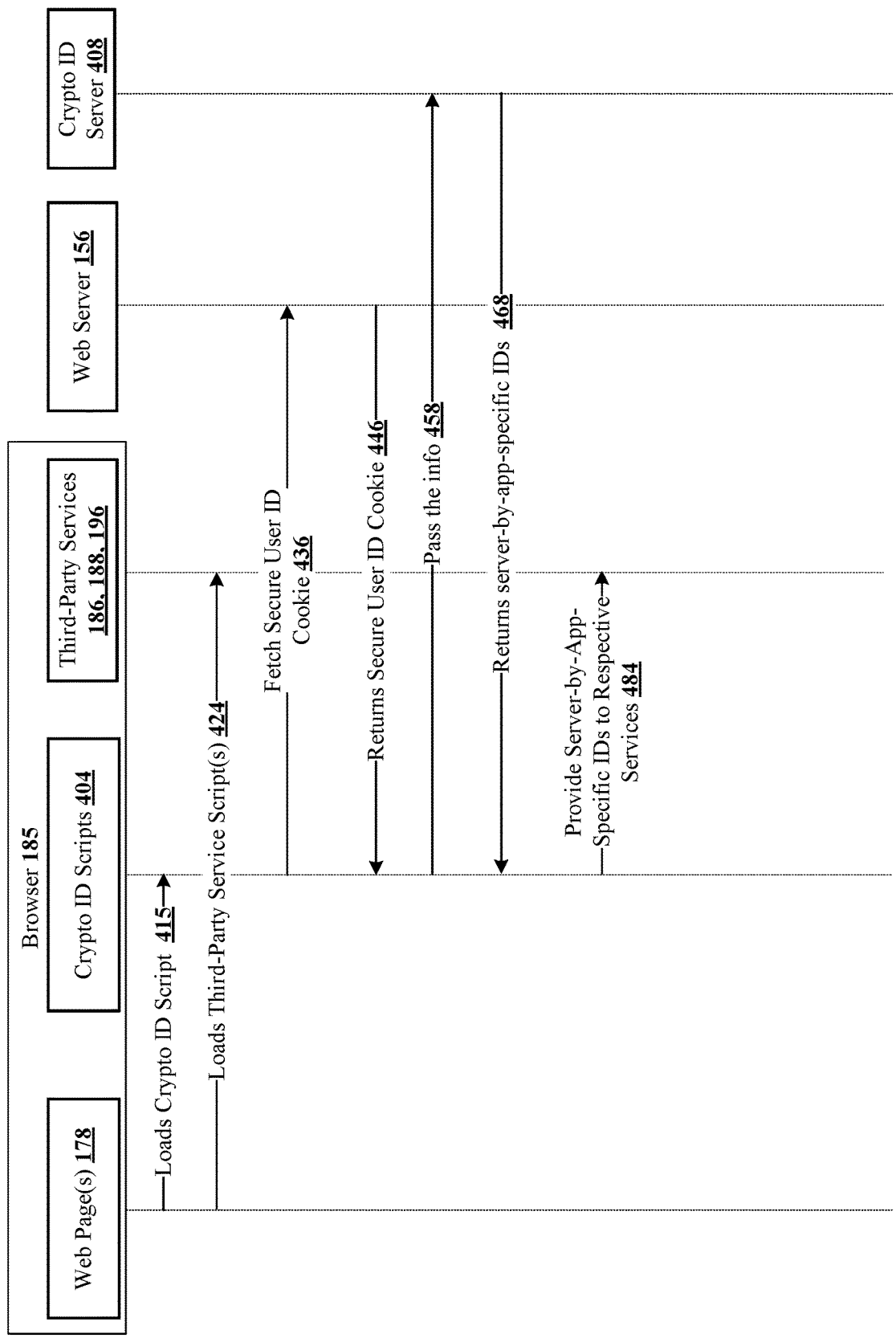
FIG. 4 illustrates a message diagram of another method of masking user identity across web servers, using crypto ID scripts.

FIG. 4 illustrates another method of masking user identity across web servers, using crypto ID scripts. In this process, browser 185 receives from a web server 156 a web page 178 that includes a crypto ID script 404 that runs in browser 185 and interfaces directly or indirectly with cryptographic ID server 408 and further includes one or more third-party service 186, 188, 196, which are also referred to as third-party apps. Web page 178 loads crypto ID script 415 and loads third-party service scripts 424. Crypto ID script 404 running in browser 185 fetches a secure user ID cookie 446. Crypto ID script 404 directly or indirectly passes the info 458, forwarding at least part of the cookie to cryptographic ID server 408. Crypto ID script 404 receives from cryptographic ID server 408, server-by-app-specific IDs 468 that are distinct and uncorrelated for distinct triplets of user, web servers and apps. Crypto ID script 404 provides respective server server-by-app-specific IDs to respective apps 484, without providing the user ID to the apps.

In some implementations, crypto ID script 404 running in browser 185 forwards at least part of the cookie to web server 156 for forwarding to cryptographic ID server 408 and receives from the server 408 the server-by-app-specific IDs generated by the cryptographic ID server. In other implementations, crypto ID script 404 running in browser 185 forwards at least part of the cookie to the cryptographic ID server 408 and receives the server-by-app-specific IDs from by the cryptographic ID server 408.

Next, we describe a computer system for gaining control over information and history sharing across web sites following elimination of third-party cookies.

Computer System

Figure 5:
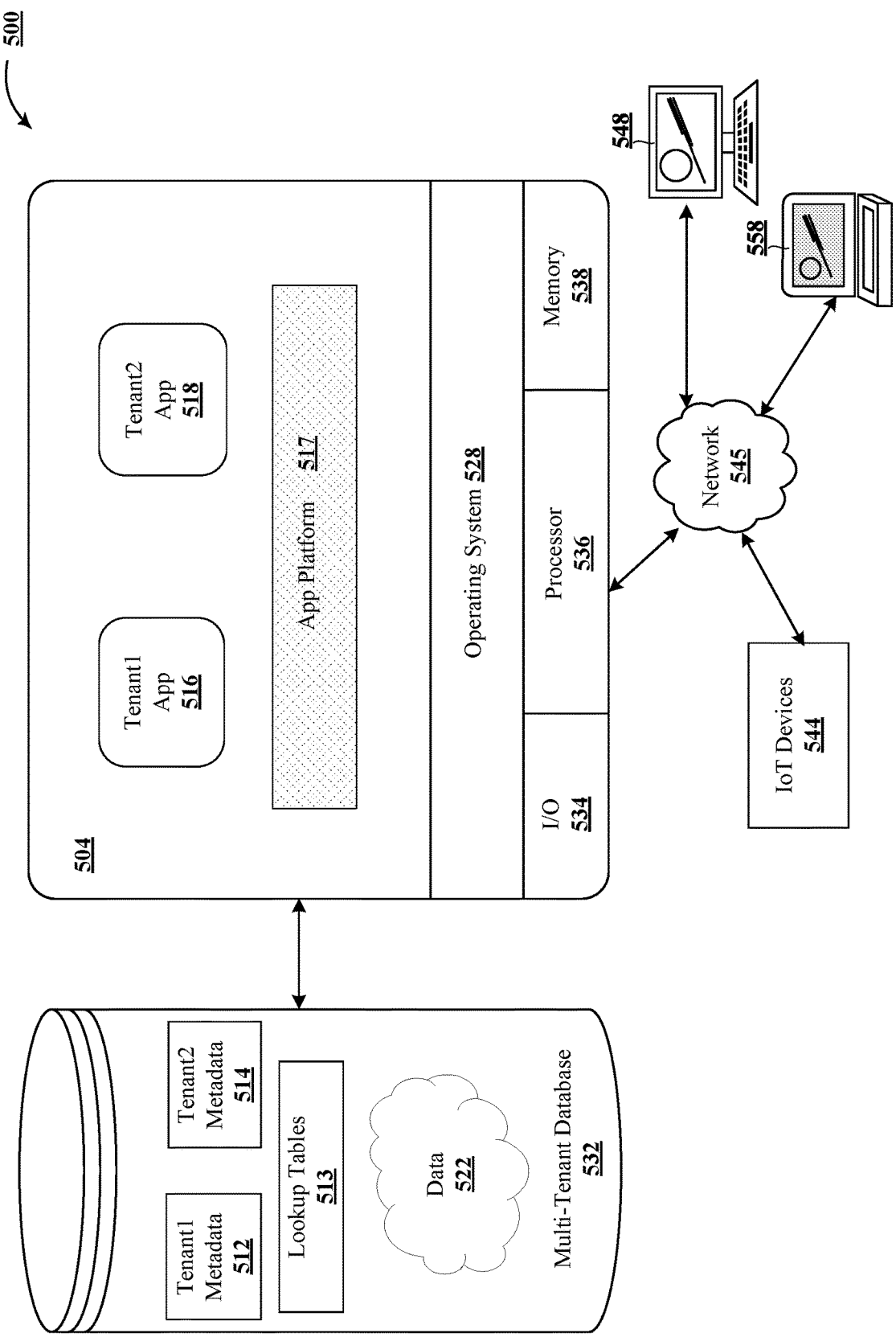
FIG. 5 presents a block diagram of an exemplary system suitable for implementing limiting sharing of visitor identity information and history sharing across web sites following elimination of third-party cookies, in accordance with an implementation of the technology disclosed.

FIG. 5 presents a block diagram of an exemplary system 500 suitable for implementing system 100 of FIG. 1 for limiting sharing of information and history sharing across web sites following elimination of third-party cookies. In general, the illustrated system 500 of FIG. 5 includes a server 504 that dynamically supports virtual applications 516 and 518, based upon data 522 from a common database 532 that is shared between multiple tenants, alternatively referred to herein as a "multi-tenant database". Data and services generated by the virtual applications 516 and 518, including GUI clients, are provided via a network 545 to any number of client devices 548 or 558, as desired.

As used herein, a "tenant" or an "organization" refers to a group of one or more users that shares access to a common subset of the data within the multi-tenant database 532. In this regard, each tenant includes one or more users associated with, assigned to, or otherwise belonging to that respective tenant. Stated another way, each respective user within the system 500 is associated with, assigned to, or otherwise belongs to a particular tenant of the plurality of tenants supported by system 500. Tenants may represent users, user departments, work or legal organizations, and/or any other entities that maintain data for particular sets of users within system 500. Although multiple tenants may share access to the server 504 and the database 532, the particular data and services provided from the server 504 to each tenant can be securely isolated from those provided to other tenants. The multi-tenant architecture therefore allows different sets of users to share functionality and hardware resources without necessarily sharing any of the data 522 belonging to or otherwise associated with other tenants.

The multi-tenant database 532 is any sort of repository or other data storage system capable of storing and managing the data 522 associated with any number of tenants. The database 532 may be implemented using any type of conventional database server hardware. In various implementations, the database 532 shares processing hardware with the server 504. In other implementations, the database 532 is implemented using separate physical and/or virtual database server hardware that communicates with the server 504 to perform the various functions described herein. The multi-tenant database 532 may alternatively be referred to herein as an on-demand database, in that the multi-tenant database 532 provides (or is available to provide) data at run-time to on-demand virtual applications 516 or 518 generated by the application platform 517, with tenant1 metadata 512 and tenant2 metadata 514 securely isolated.

In practice, the data 522 may be organized and formatted in any manner to support the application platform 522. In various implementations, conventional data relationships are established using any number of lookup tables 513 for indexing, uniqueness, relationships between entities, and/or other aspects of conventional database organization as desired.

The server 504 is implemented using one or more actual and/or virtual computing systems that collectively provide the dynamic application platform 517 for generating the virtual applications. For example, the server 504 may be implemented using a cluster of actual and/or virtual servers operating in conjunction with each other, typically in association with conventional network communications, cluster management, load balancing and other features as appropriate. The server 504 operates with any sort of conventional processing hardware such as a processor 536, memory 538, input/output devices 534 and the like. The input/output devices 534 generally represent the interface(s) to networks (e.g., to the network 545, or any other local area, wide area or other network), mass storage, display devices, data entry devices and/or the like. User interface input devices 534 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include possible types of devices and ways to input information into application platform 517.

User interface output devices can include a display subsystem, a printer, a fax machine, or non-visual displays such as audio output devices. The display subsystem can include a light emitting diode (LED) screen, a flat-panel device such as a liquid crystal display (LCD), a cathode ray tube (CRT), a projection device, or some other mechanism for creating a visible image. The display subsystem can also provide a non-visual display such as audio output devices. In general, use of the term "output device" is intended to include all possible types of devices and ways to output information from processor 536 to the user or to another machine or computer system.

The processor 536 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 538 represents any non-transitory short- or long-term storage or other computer-readable media capable of storing programming instructions for execution on the processor 536, including any sort of random access memory (RAM), read only memory (ROM), flash memory, magnetic or optical mass storage, and/or the like. The computer-executable programming instructions, when read and executed by the server 504 and/or processor 536, cause the server 504 and/or processor 536 to create, generate, or otherwise facilitate the application platform 517 and/or virtual applications 516 and 518, and perform one or more additional tasks, operations, functions, and/or processes described herein. It should be noted that the memory 538 represents one suitable implementation of such computer-readable media, and alternatively or additionally, the server 504 could receive and cooperate with external computer-readable media that is realized as a portable or mobile component or application platform, e.g., a portable hard drive, a USB flash drive, an optical disc, or the like.

The application platform 517 is any sort of software application or other data processing engine that generates the virtual applications 516 and 518 that provide data and/or services to the client devices 548 and 558. In a typical implementation, the application platform 517 gains access to processing resources, communications interfaces and other features of the processing hardware using any sort of conventional or proprietary operating system 528. The virtual applications 516 and 518 are typically generated at run-time in response to input received from the client devices 548 and 558.

With continued reference to FIG. 5, the data and services provided by the server 504 can be retrieved using any sort of personal computer, mobile telephone, tablet or other network-enabled client device 548, 558 and IoT devices 544 on network 545. In an exemplary implementation, the client device 548, 558 includes a display device, such as a monitor, screen, or another conventional electronic display capable of graphically presenting data and/or information retrieved from the multi-tenant database 532.

In some implementations, network(s) 545 can be any one or any combination of Local Area Network (LAN), Wide Area Network (WAN), WiMAX, Wi-Fi, telephone network, wireless network, point-to-point network, star network, token ring network, hub network, mesh network, peer-topeer connections like Bluetooth, Near Field Communication (NFC), Z-Wave, ZigBee, or other appropriate configuration of data networks, including the Internet.

The foregoing description is merely illustrative in nature and is not intended to limit the implementations of the subject matter or the application and uses of such implementations. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary implementations described herein are not intended to limit the scope or applicability of the subject matter in any way.

The technology disclosed can be implemented in the context of any computer-implemented system including a database system, a multi-tenant environment, or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

Moreover, the technology disclosed can be implemented using two or more separate and distinct computer-implemented systems that cooperate and communicate with one another. The technology disclosed can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

Some Particular Implementations

We describe various implementations of limiting sharing of visitor identity information across web sites, following elimination of third-party cookies.

One implementation of a disclosed method of limiting sharing of visitor identity information across web sites includes receiving, from a visited web site server in a visitor's browser, a web page that includes a privacy script that runs in the visitor's browser and interfaces directly or indirectly with a privacy ID server, and includes one or more third-party apps that seek identification of the visitor. The method also includes the privacy script running in the browser retrieving a first party cookie including a visitor ID, the privacy script forwarding directly or indirectly at least part of the first party cookie to the privacy ID server, and the privacy script receiving from the privacy ID server, a site-by-app-specific ID for the visited web site and one of the third party apps, wherein site-by-app-specific IDs for the visitor are distinct and uncorrelated among distinct pairs of web sites and the third-party apps. The disclosed method further includes the privacy script providing respective site-by-app-specific IDs to respective third-party apps, without providing the visitor ID to the third-party apps, thereby allowing tracking of the visitor on repeat visits to the visited web site but not facilitating identification of the visitor across web sites.

This method and other implementations of the technology disclosed can include one or more of the following features and/or features described in connection with additional methods disclosed. In the interest of conciseness, the combinations of features disclosed in this application are not individually enumerated and are not repeated with each base set of features.

One disclosed method further includes the privacy script running in the browser forwarding at least part of the cookie to the server for forwarding to the privacy ID server and receiving from the server the site-by-app-specific IDs generated by the privacy ID server.

Some implementations of the disclosed method further include the privacy script running in the browser forwarding at least part of the cookie to the privacy ID server and receiving the server-by-app-specific IDs from by the privacy ID server.

For many implementations of the disclosed method, the sharing of visitor identity information across web sites occurs following elimination of third-party cookies.

One implementation of a disclosed method of masking user identity across web servers includes receiving from a server a web page that includes a crypto ID script that runs in a browser and interfaces directly or indirectly with a cryptographic ID server and further includes one or more apps. The method also includes the crypto ID script running in the browser retrieving a cookie including a user ID, the crypto ID script forwarding directly or indirectly at least part of the cookie to the cryptographic ID server, and the crypto ID script receiving from the cryptographic ID server a server-by-app-specific ID for the visited web site and one of the apps, wherein the server-by-app-specific IDs are distinct and uncorrelated for distinct triplets of user, the web servers and the apps. The disclosed method further includes the cryptographic ID server providing respective server-by-app-specific IDs to respective apps, without providing the user ID to the apps.

In one implementation of the disclosed method, the crypto ID script running in the browser forwards at least part of the cookie to the server for forwarding to the cryptographic ID server and receives from the server the server-by-app-specific IDs generated by the cryptographic ID server.

In some implementation of the disclosed method, the crypto ID script running in the browser forwards at least part of the cookie to the cryptographic ID server and receives the server-by-app-specific IDs from by the cryptographic ID server.

As used in this context website refers to browsers on desktop machines and mobile devices as well as mobile apps on iOS and Android platforms. One of reasonable skill in the art will understand that code can be repurposed between browser pages and web apps by following developer guidelines for html and JavaScript for the specific platforms.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One disclosed implementation may include a tangible non-volatile computer readable storage media loaded with computer program instructions that, when executed on a server, cause a computer to implement any of the methods described earlier.

Another disclosed implementation may include a server system including one or more processors and memory coupled to the processors, the memory loaded with instructions that, when executed on the processors, cause the server system to perform any of the methods described earlier.

This system implementation and other systems disclosed optionally can also include features described in connection with methods disclosed. In the interest of conciseness, alternative combinations of system features are not individually enumerated. Features applicable to systems, methods, and articles of manufacture are not repeated for each statutory class set of base features. The reader will understand how features identified in this section can readily be combined with base features in other statutory classes.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

We claim as follows:

1. A method of limiting sharing of visitor identity information across web sites, including:
   receiving from a visited web site server in a visitor's browser a web page that
   includes a privacy script that runs in the visitor's browser and interfaces directly or indirectly with a privacy ID server and
   includes one or more third-party apps that seek identification of the visitor;
   the privacy script running in the browser retrieving a first party cookie including a visitor ID;
   the privacy script forwarding directly or indirectly at least part of the first party cookie to the privacy ID server;
   the privacy script receiving from the privacy ID server, a site-by-app-specific ID for the visited web site and one of the third-party apps, wherein site-by-app-specific IDs for the visitor are distinct and uncorrelated among distinct pairs of the web sites and the third-party apps; and
   the privacy script providing respective site-by-app-specific IDs to respective third-party apps, without providing the visitor ID to the third-party apps, thereby allowing tracking of the visitor on repeat visits to the visited web site but not facilitating identification of the visitor across web sites.

2. The method of claim 1, wherein the privacy script running in the browser forwards the at least part of the cookie to the server for forwarding to the privacy ID server and receives from the server the site-by-app-specific IDs generated by the privacy ID server.

3. The method of claim 1, wherein the privacy script running in the browser forwards the at least part of the cookie to the privacy ID server and receives the server site-by-app-specific IDs from by the privacy ID server.

4. The method of claim 1, wherein the sharing of visitor identity information across web sites occurs following elimination of third-party cookies.

5. A server system including one or more processors and memory coupled to the processors, the memory loaded with instructions that, when executed on the processors, cause the server system to perform the method of claim 1.

6. The server system of claim 5, wherein the privacy script running in the browser forwards the at least part of the cookie to the server for forwarding to the privacy ID server and receives from the server the site-by-app-specific IDs generated by the privacy ID server.

7. The server system of claim 5, wherein the privacy script running in the browser forwards the at least part of the cookie to the privacy ID server and receives the server site-by-app-specific IDs from by the privacy ID server.

8. The server system of claim 5, wherein the sharing of visitor identity information across web sites occurs following elimination of third-party cookies.

9. A tangible non-volatile computer readable storage media loaded with instructions that, when executed on a server, cause the server system of claim 5 to perform the method of claim 1.

10. The tangible non-volatile computer readable storage media of claim 9, wherein the privacy script running in the browser forwards the at least part of the cookie to the privacy ID server and receives the server site-by-app-specific IDs from by the privacy ID server.

11. The tangible non-volatile computer readable storage media of claim 9, wherein the sharing of visitor identity information across web sites occurs following elimination of third-party cookies.

12. A method of masking user identity across web servers, including:
   receiving from a server a web page that includes a crypto ID script that runs in a browser and interfaces directly or indirectly with a cryptographic ID server and further includes one or more apps;
   the crypto ID script running in the browser retrieving a cookie including a user ID;
   the crypto ID script forwarding directly or indirectly at least part of the cookie to the cryptographic ID server;
   the crypto ID script receiving from the cryptographic ID server, a server-by-app-specific ID for a visited web site and one of the apps, wherein the server-by-app-specific IDs are distinct and uncorrelated among distinct triplets of user, the web servers and the apps; and
   the crypto ID script providing respective server-by-app-specific IDs to respective apps, without providing the user ID to the apps.

13. The method of claim 12, wherein the crypto ID script running in the browser forwards the at least part of the cookie to the server for forwarding to the cryptographic ID server and receives from the server the server-by-app-specific IDs generated by the cryptographic ID server.

14. The method of claim 12, wherein the crypto ID script running in the browser forwards the at least part of the cookie to the cryptographic ID server and receives the server-by-app-specific IDs from by the cryptographic ID server.

15. A server system including one or more processors and memory coupled to the processors, the memory loaded with instructions that, when executed on the processors, cause the server system to perform the method of claim 12.

16. The server system of claim 15, wherein the crypto ID script running in the browser forwards the at least part of the cookie to the server for forwarding to the cryptographic ID server and receives from the server the server-by-app-specific IDs generated by the cryptographic ID server.

17. The server system of claim 15, wherein the crypto ID script running in the browser forwards the at least part of the cookie to the cryptographic ID server and receives the server-by-app-specific IDs from by the cryptographic ID server.

18. A tangible non-volatile computer readable storage media loaded with instructions that, when executed on a server, cause the server system of claim 15 to perform the method of claim 12.

19. The tangible non-volatile computer readable storage media of claim 18, wherein the crypto ID script running in the browser forwards the at least part of the cookie to the server for forwarding to the cryptographic ID server and receives from the server the server-by-app-specific IDs generated by the cryptographic ID server.

20. The tangible non-volatile computer readable storage media of claim 18, wherein the crypto ID script running in the browser forwards the at least part of the cookie to the cryptographic ID server and receives the server-by-app-specific IDs from by the cryptographic ID server.

* * * * *